US008325080B1

(12) United States Patent
Frazier

(10) Patent No.: US 8,325,080 B1
(45) Date of Patent: Dec. 4, 2012

(54) RADIO FREQUENCY PARTICLES

(75) Inventor: Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 410 days.

(21) Appl. No.: 12/691,682

(22) Filed: Jan. 21, 2010

Related U.S. Application Data

(60) Provisional application No. 61/146,609, filed on Jan. 22, 2009.

(51) Int. Cl.
*G01S 7/36* (2006.01)
(52) U.S. Cl. ............................................. 342/15; 342/13
(58) Field of Classification Search ............... 342/13–20
See application file for complete search history.

(56) References Cited

U.S. PATENT DOCUMENTS

| | | | | |
|---|---|---|---|---|
| 4,638,316 A * | 1/1987 | Austin et al. | .................... | 342/14 |
| 5,369,408 A | 11/1994 | Tsui et al. | | |
| 7,369,081 B1 | 5/2008 | Ganz et al. | | |
| 7,916,065 B1 * | 3/2011 | Mintz et al. | ..................... | 342/13 |
| 2004/0080447 A1 | 4/2004 | Bas | | |
| 2005/0150371 A1 * | 7/2005 | Rickard | ........................ | 89/1.11 |

FOREIGN PATENT DOCUMENTS

| | | |
|---|---|---|
| DE | 100 12 204 A1 | 9/2001 |
| WO | WO 2008/065989 A1 | 6/2008 |
| WO | WO 2008/065993 A1 | 6/2008 |

OTHER PUBLICATIONS

Written Opinion of the International Searching Authority for International Application No. PCT/US2010/021683, filed Jan. 21, 2010, Written Opinion dated Sep. 28, 2010 and mailed Oct. 5, 2010 (13 pgs.).
International Search Report for International Application No. PCT/US2010/021683, filed Jan. 21, 2010, International Search Report dated Sep. 28, 2010 and mailed Oct. 5, 2010 (5 pgs.).
Mura, et al. "RF-Powder: Fabrication of 0.15-mm Si-powder Resonating at Microwave Frequencies", Proceedings of the 37th European Microwave Conference, Munich Germany, Oct. 2007, pp. 392-395.

* cited by examiner

*Primary Examiner* — Timothy A Brainard
(74) *Attorney, Agent, or Firm* — Christie, Parker & Hale, LLP

(57) ABSTRACT

Particle circuits for disrupting signals associated with a communication system or for marking a position of a device are provided. In one embodiment, the invention relates to a composite for generating radio frequency (RF) signals, the composite including a medium configured to adhere to a device for emanating communication signals, and at least one particle circuitry within the medium, wherein the at least one particle circuitry is configured to radiate radio frequency signals for disrupting the communication signals of the device.

32 Claims, 10 Drawing Sheets

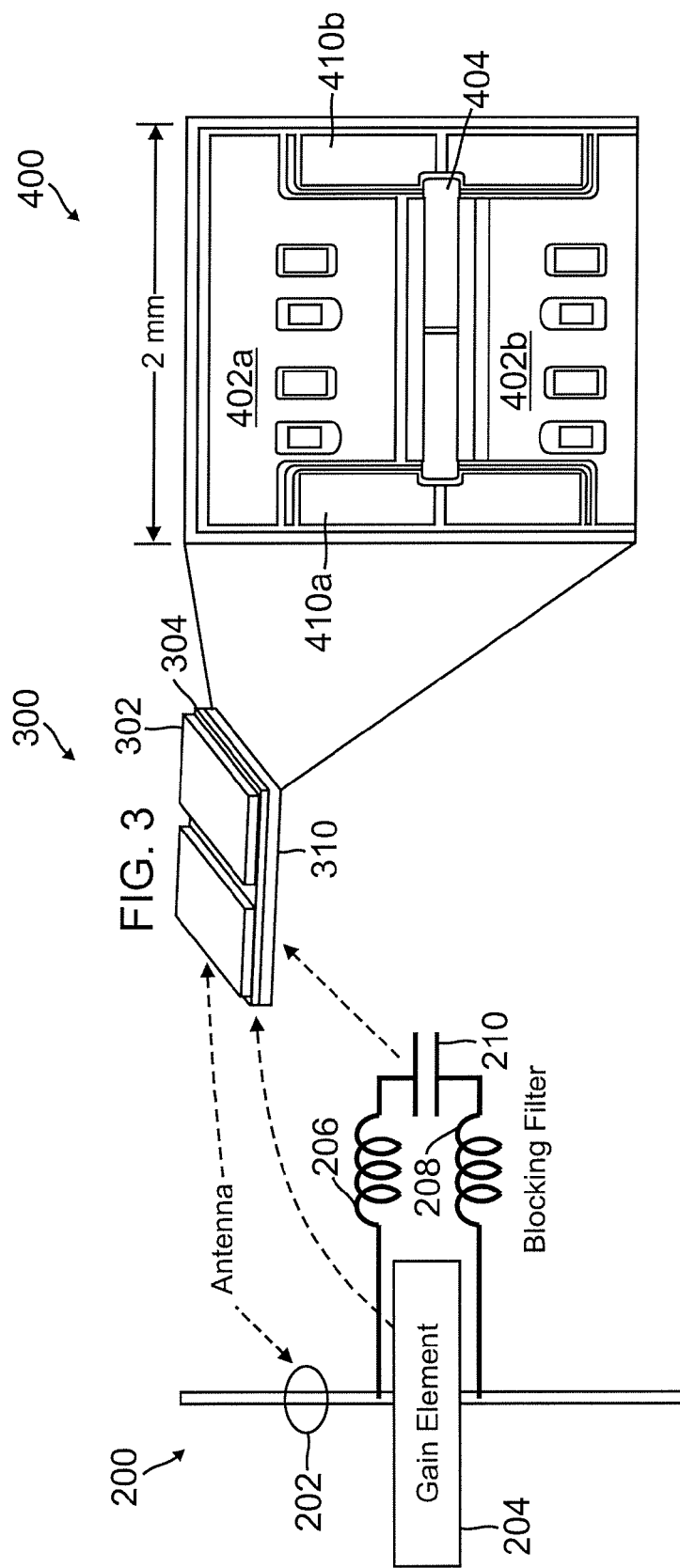

RADIO FREQUENCY PARTICLES

CROSS-REFERENCE TO RELATED APPLICATION(S)

The present application claims the benefit of Provisional Application No. 61/146,609, filed Jan. 22, 2009, entitled "RADIO FREQUENCY PARTICLES", the entire content of which is incorporated herein by reference.

BACKGROUND TO THE INVENTION

The present invention relates generally to a system and a method for degrading the operating characteristics of a radar or other radio frequency system such that the system has reduced detection range or significant aiming errors. More specifically, the present invention relates to a system and a method for using paint-like coatings or particles that can absorb and emit radio signals to disrupt the operation of a radar system.

Radar systems use electromagnetic waves to identify characteristics such as range, altitude, direction, or speed of both moving and stationary objects such as aircraft, ships, motor vehicles, weather formations, and terrain. The radar system antenna sends out pulses of radio waves or microwaves. These pulsed waves are reflected off of objects in their path, and return to the antenna, which detects and measures the reflected waves. Using the time it takes for the reflected waves to return to the antenna, a radar system computer calculates how far away the object is, its radial velocity and other characteristics.

In military applications, it is generally useful to provide a means for disrupting an enemy's fire control radar system so that missiles that rely upon this system for guidance cannot be accurately directed to their intercept point. Today, the most effective, and destructive, countermeasure to radar is to attack the system using an anti-radiation missile (ARM). An ARM homes-in on the transmit beam of the radar and uses kinetic or chemical energy to neutralize the radar. This approach, to make little pieces out of big pieces of the radar, has the drawback that this process is thermodynamically irreversible and may in fact be viewed as a hostile act by the government or organization that has deployed the radar. An ARM attack would certainly be viewed as an unfriendly act by the personnel situated close to the insulted radar. Thus, there is a general need for a system and a method to disrupt radar operation without limiting the ability of the radar to recover from the disruption at a later time.

SUMMARY OF THE INVENTION

One object of the present invention is to provide a material that can be deposited onto the antenna of a radar or other radio frequency system in a manner that disrupts the sensitivity or focusing characteristic of the system to the degree that it becomes incapable of detecting downrange targets or accurately directing fire toward a detected target.

In one embodiment, the invention relates to a composite for generating radio frequency (RF) signals, the composite including a medium configured to adhere to a device for emanating communication signals, and at least one particle circuitry within the medium, wherein the at least one particle circuitry is configured to radiate radio frequency signals for disrupting the communication signals of the device.

In another embodiment, the invention relates to a composite for generating radio frequency (RF) signals, the composite including a medium configured to adhere to a device for emanating communication signals, and at least one particle circuitry within the medium, wherein the at least one particle circuitry is configured to radiate signals for marking a position of the device.

In yet another embodiment, the invention relates to a particle for disrupting signals associated with a source of ambient radio frequency (RF) energy, the particle including: circuitry configured to receive energy from the source of ambient RF energy, and generate radio frequency signals, using the received energy, for disrupting signals emanating from the source of ambient RF energy.

In still yet another embodiment, the invention relates to a composite for disrupting signals associated with a source of ambient radio frequency (RF) energy, the composite including a medium containing at least one particle including an antenna and a gain element, the gain element configured to rectify radio frequency energy received by the antenna, and oscillate using the received energy.

BRIEF DESCRIPTION OF THE DRAWINGS

FIG. 2 is a schematic block diagram of a particle circuit in accordance with one embodiment of the invention.

FIG. 3 is a perspective view of an integrated circuit implementation of the particle circuit of FIG. 2 in accordance with one embodiment of the invention.

FIG. 4a is a top view of the integrated circuit implementation of FIG. 3.

DETAILED DESCRIPTION OF THE INVENTION

Figure 1:
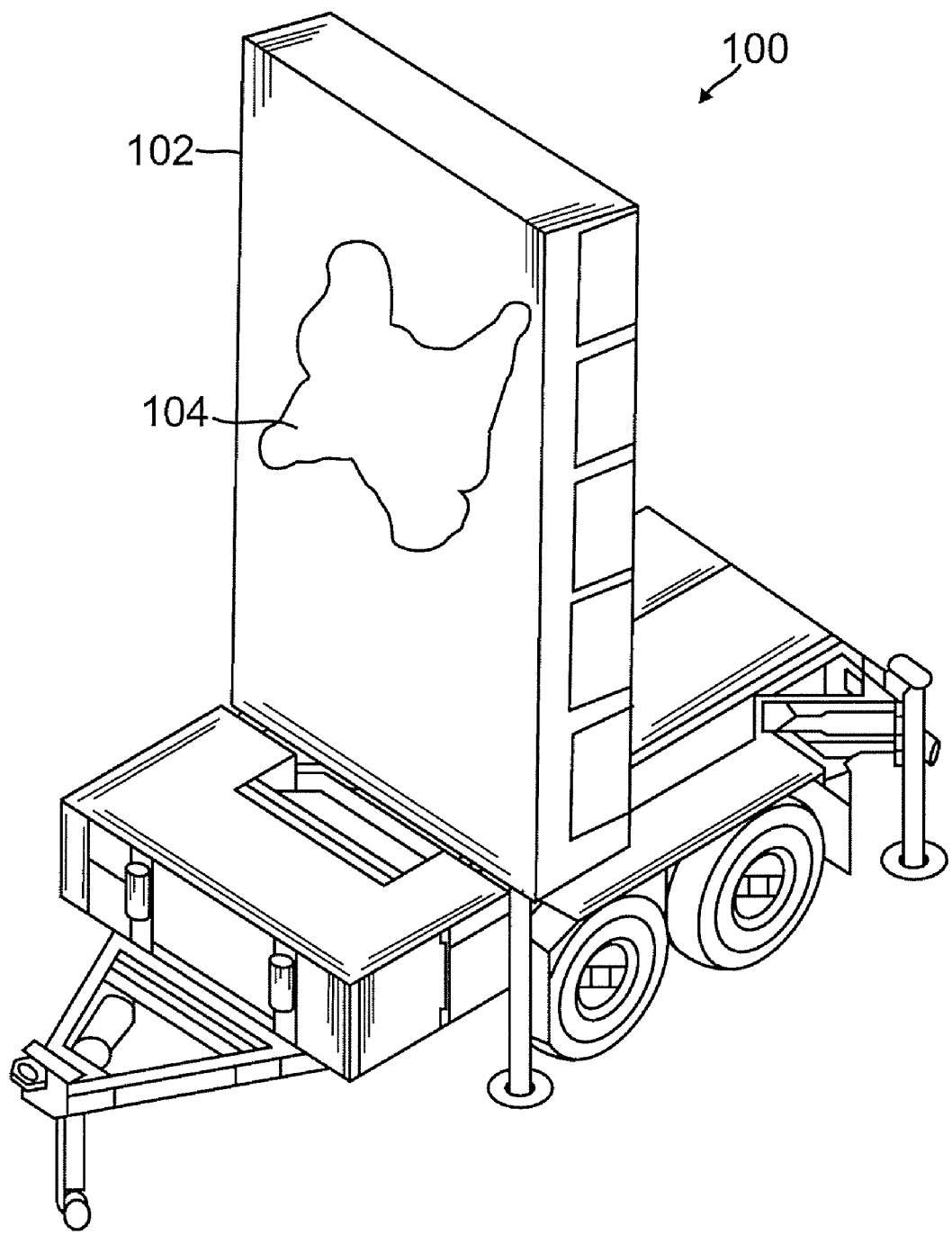
FIG. 1 is a perspective view of a radar system with a disruptive paint or other material applied to a surface of an antenna of the radar system in accordance with one embodiment of the invention.

Referring now to the drawings, embodiments of particles constructed according to the invention emit radio frequency (RF) signals that can be disruptive to nearby radar or other RF systems. In other embodiments, the particles emit non-disruptive RF signals for position marking or tagging applications. The particles may be pigment particles and can be applied to the radar system using a fluid medium such as paint, a collection of dust-like particles, or by other suitable means. In some embodiments, the paint is deposited in the path of the radar transmit and receive signals. For example, the paint may be sprayed or splattered onto a radar dish or phased array antenna. When the radar system becomes active, each particle can absorb some of the energy transmitted by the radar and can store this energy in electrical form within the particle battery.

After the radar ceases to transmit, the energy stored in the particle is used to power the particle oscillator. The oscillator, being coupled to its antenna, emits radio frequency energy and this energy can be intercepted by the radar receiver. A plurality of such particles, collectively excited by the radar, produces a strong radio frequency signal that can be directed into the radar receiver. A sufficient signal from the particles can either overload the front end of the radar receiver or raise the apparent background noise within the receiver circuitry. In some embodiments, the particles are applied to the radar systems using a paint gun pellet, a spherical vessel, or other suitable vessels. In other embodiments, the particles direct the RF emissions to a remote RF receiver in a tagging application.

In many embodiments, the particles of the invention include an electronic circuit. In some embodiments, the electronic circuits store RF energy received from the "host" radar system and generate disruptive RF signals using the stored energy. In one such case, for example, the particle circuit includes an antenna for both receiving and radiating energy, a gain element for boosting received energy and radiated energy, and a battery for storing the received energy (e.g., a capacitor).

In other embodiments, the particle circuits store solar energy and generate disruptive signals using stored solar energy. For example, in one such embodiment, the particle circuit includes a solar cell for generating energy, a gain element for boosting either received solar energy or stored solar energy, a battery for storing the solar energy, and an oscillating antenna for generating the disruptive RF signals.

In yet other embodiments, the particle circuits receive solar and/or RF energy and convert it into disruptive and/or non-disruptive RF signals without storing the energy. In a number of embodiments, different configurations of components can be used to implement particle circuits that can receive energy and use that energy to generate signals disruptive to a radar system or non-disruptive for position marking.

The term pigment generally refers to a substance that provides color. As used within this application, pigment has a broader meaning.

FIG. 1 is a perspective view of a radar system with a disruptive paint or other material applied to a surface of an antenna of the radar system in accordance with one embodiment of the invention. The radar system 100 includes an antenna 102 having an area 104 covered with a paint containing one or more pigment particles (not visible).

In operation, the pigment particles receive RF energy generated when the radar system transmits radar signals. When the radar system becomes active, each particle can absorb some of the energy transmitted by the radar and can store this energy in electrical form within the particle battery. After the radar ceases to transmit, the energy stored in the particle is used to power the particle oscillator. The oscillator, being coupled to its antenna emits radio frequency energy and this energy can be intercepted by the radar receiver. A plurality of such pigment particles, collectively excited by the radar, produces a strong radio frequency signal that can be directed into the radar receiver. A sufficient signal from the particles either overloads the front end of the radar receiver or raises the apparent background noise within the receiver circuitry. In other embodiments, the particles produce RF signals for position marking.

Raising the noise floor of the receiver can force the radar operator to increase the threshold for target detection in order to reduce the probability of false detection alarms. The increase in signal detection threshold reduces the ability of the radar to detect those targets that provide a marginal radar echo signal at the radar. If the net radio frequency signal from the pigment particles overloads the front end of the radar receiver, then intermodulation effects within the radar receiver degrade the effective noise figure of the radar or otherwise degrade the ability of the radar to detect a target.

In several embodiments, the paint is used to absorb energy from the radar and re-emit this form of energy after the excitation has ceased. While not bound by any particular theory, this use is analogous to the phenomenon of optical phosphorescence where a material may store energy absorbed from an optical light source and re-emit this energy after the light source has been removed. Thus, in some embodiments, the pigment particles can be thought of as phosphors.

The final thickness of the deposited RF paint can be a variable of manufacture which is adjusted by controlling the viscosity of an optional fluid that suspends the RF phosphors within a deployment container and the speed with which the paint collides with the radar surface. The deployment container can be, as an example, a paint ball pellet as is used in recreational paint ball guns. In a number of embodiments, the viscosity and terminal speed are adjusted so that the RF paint is deposited as a mono-layer of RF phosphor particles. However, even a layer of RF phosphor particles that is greater than a monolayer can still have a detrimental effect on the radar system since each layer of pigment particles can absorb some fraction of the radar signal and still be able to radiate some signal through any intervening layers of pigment to disrupt the radar receiver.

FIG. 2 is a schematic block diagram of a pigment particle circuit in accordance with one embodiment of the invention. The pigment particle circuit 200 includes an antenna 202, a gain element 204, a first blocking filter 206, a second blocking filter 208, and a capacitor 210. The gain element 204 is disposed along the antenna 202. The first blocking filter 206 is coupled to one terminal of the gain element 204, while the second blocking filter 208 is coupled to another terminal of the gain element 204. The first blocking filter 206 is also coupled to one terminal of the capacitor 210, while the second blocking filter 208 is coupled to another terminal of the capacitor 210.

In operation, the antenna 202 receives energy in the form of radar signals from a radar or other RF system (not shown). The gain element 204 amplifies and/or rectifies the received radar signals. The amplified signals and energy can be stored in the capacitor 210. The blocking filters (206, 208) isolate the capacitor 210 from the antenna 202 and gain element 204. In a number of embodiments, the blocking filters are coils used to block high frequency signals and pass low frequency, or direct current (DC), signals. Energy stored in the capacitor 210 is dissipated at particular frequencies using the antenna 202. In such case, the capacitor 210 and antenna 204 act together as an oscillator. The oscillator generates signals at preselected frequencies. In most embodiments, the preselected frequencies are frequencies known to be disruptive to a radar or other RF system. In some embodiments, for example, the preselected frequencies are in the range from 50 MHz to 100 GHz.

The gain element 204 can have both diode-like (rectifying) and gain properties. Examples of suitable gain elements include a transistor, tunnel diode, or other device. As a diode, the gain element rectifies the received energy from the radar system and stores this pulsed DC power in a capacitor or thin film battery. This circuit function is popularly known as a rectenna, or rectifying antenna. The blocking filters pass the rectified DC current to the capacitor while isolating the capacitor from the RF circuit. When the radar system ceases to transmit, the electrical energy stored in the capacitor flows back into the gain element. The antenna provides a resonator and feedback so the circuit oscillates at the antenna frequency. The circuit can oscillate until the energy in the capacitor is depleted. Since many fire control radars operate with a pulse repetition rate in the kilohertz (KHz) range, the pigment particle circuit need only radiate for a few hundred microseconds before the next transmit pulse recharges the circuit.

In one embodiment, a single one inch sphere (e.g. paint ball size) of RF paint containing approximately 1,000 RF pigment particles suspended in a resin and applied to a dish antenna produces a signal of approximately 20 mW directly into the antenna feed. Such signal strength is 10 orders of magnitude larger than a radar echo from a standoff attack aircraft. This implies up to a 100 dB increase in the constant false alarm rate (CFAR) threshold in a typical engagement radar, which is enough to completely disrupt its operation.

In many embodiments, the antenna 202 and gain elements 204 act in concert as a rectifying antenna or rectenna. In several embodiments, the antenna 202 and capacitor 210 act as an oscillator to generate the signals that can disrupt a radar system. In some embodiments, the gain element 204 is a rectifying diode. In other embodiments, other suitable gain elements can be deployed.

In some embodiments, a switch can be coupled to the capacitor to enable an external control for controlling the timing of the generation of radar jamming signals. In one embodiment, the switch can be controlled by a signal indicative of a threshold amount of RF energy received at a preselected frequency. In other embodiments, the switch can be controlled by a remote device such as a laser.

In the embodiment illustrated in FIG. 2, the blocking filters are coils that can isolate the antenna section from the energy storage section. In other embodiments, other circuitry can be used to isolate the antenna section from the energy storage section. In the embodiment illustrated in FIG. 2, the capacitor (e.g., thin film capacitor) is used as the energy storage device. In other embodiments, a battery (e.g., thin film lithium ion battery) can be used as the energy storage device. In other embodiments, other suitable energy storage devices can be used.

In one embodiment, the antenna 202 can be a dipole antenna including one or more dipole antenna elements. In some embodiments, the antenna can be a spiral antenna supporting a narrow frequency range or a broadband spiral antenna supporting a wide frequency range. In other embodiments, other suitable antennas can be used.

In one embodiment, the pigment particle, or phosphor particle, is a radar powered oscillator consisting of a single antenna, a two-terminal device possessing both a rectifying (diode-like) response and a negative differential resistance (NDR) response, an RF blocking filter, and a storage capacitor or battery. Radio frequency power collected by the antenna is directly rectified by the NDR device and passes through the filter to charge the capacitor or battery. When the radar ceases to transmit, the energy stored in the capacitor or battery biases the NDR device in its region of negative resistance. This bias region spontaneously induces oscillation in the circuit. The circuit, being connected to an antenna radiates this energy into free space and some of this energy is intercepted by the radar receiver.

In another embodiment, the pigment particle is a radar powered amplifier consisting of a single antenna, a two-terminal device possessing a rectifying (diode-like) response and a negative differential resistance (NDR) response, an RF blocking filter, and a storage capacitor or battery. Radio frequency power collected by the antenna is directly rectified by the NDR device and passes through the blocking filter to charge the capacitor or battery. When the radar ceases to transmit, the energy stored in the capacitor or battery biases the NDR device in its region of negative resistance. The NDR device is designed to amplify but not oscillate when biased in the NDR region. As a result the particle amplifies radio frequency signals collected by its antenna rather than spontaneously emitting radiation. The circuit, being connected to an antenna both receives signals collected by the pigment particle and radiates this amplified energy into free space. Some of this radiated energy is intercepted by the radar receiver. The amplitude and phase of the signals received and re-radiated by the RF phosphor particles are different from the amplitude and phase of the received signal. This change in amplitude and phase effectively distorts the antenna aim point or reduces the signals collected by the radar through constructive interference of those signals received directly by the radar and those signals collected through the action of the RF paint.

In yet another embodiment, the pigment particle consists of two, mutually isolated antennas, a rectifying diode, a two-port amplifier or oscillator circuit, an RF blocking filter, and a storage capacitor or battery. Radio frequency power collected by the first antenna is directly rectified by the rectifier and passes through the block filter to charge the capacitor or battery. When the radar ceases to transmit, the energy stored in the capacitor or battery is used to power the two-port amplifier or oscillator. The output of the amplifier or oscillator is connected to the second antenna. As a result the particle amplifies (or oscillates and radiates its own) radio frequency signals collected by its first antenna and emit this signal into free space via its second antenna. Some of this radiated energy is intercepted by the radar receiver. The amplitude and phase of the signals received and re-radiated by the RF phosphor particles are different from the amplitude and phase (and possibly frequency) of the received signal. This change in amplitude and phase (and possible frequency) effectively distorts the antenna aim point or reduces the signal collected by the radar.

In another embodiment, the pigment particle consists of a two, mutually isolated antennas, a rectifying diode, a two-port phase-locked oscillator circuit, an RF blocking filter, and a storage capacitor or battery. Radio frequency power collected by the first antenna is directly rectified by the rectifier and passes through the block filter to charge the capacitor or battery. While the radar transmitter is operating, the oscillator circuit uses the principle of phase locking to match the frequency and phase of the radar signal. When the radar ceases to transmit, the energy stored in the capacitor or battery continues to power the two-port oscillator. The output of the oscillator can be phase locked to the transmitter for a certain period of time after the transmitter excitation has ceased. This time constant is controlled by the parameters of the pigment particle circuitry.

These parameters can be chosen by design such that the phase and oscillation frequency of the oscillator remains relatively unchanged during the time that the radar would normally be listening for an echo return from a target. Some of the energy radiated from the pigment particle is intercepted by the radar receiver. The signals received by the radar from the target echo and the pigment particles are relatively closely matched in frequency and phase, which can cause significant disruption of the receiver operation. An extension of this embodiment uses an on board timing circuit to measure the pulse width of the radar so that the signals emitted from the RF phosphor particles not only match the frequency and phase of the radar transmitter but also its pulse duration. This can further confuse the radar system and operators and have an effect similar to that of a remote intelligent jammer.

In another embodiment, the phosphor particles contain a timing circuit so that a delay is introduced between the time that the radar ceases to transmit and the time at which the paint begins to radiate. The activation of the radar transmitter may be used both to power the pigment particles and to reset the timing circuit so that the pigment particles can begin to radiate after a preset timing interval elapses from the time the radar has ceased operation. One advantage of this embodiment is that it enables a remote direction finding receiver to sense the location of the radar by detecting the radio emissions from the pigment particles even if the radar transmitter ceases operation and moves to a different location.

In yet another embodiment, the phosphor particles consist of a radar powered oscillator that is designed to radiate simultaneously with the radar transmitter. Rather than store energy for use after the radar ceases to transmit, the particles immediately use the energy available from the radar transmitter to power their oscillator circuitry. One advantage of this embodiment is that the electrical power available to power the pigment particles tends to be substantially greater if this energy does not need to be stored for later use. This embodiment also enables a remote direction finding receiver to sense the location of the radar by detecting the stronger radio emissions from the pigment particles at significant angles off of the direction of the radar's main beam. Also, the size and electrical energy capacity of the pigment energy storage device (capacitor or battery) can be significantly smaller for this embodiment since its purpose is to filter rectified RF energy from the radar transmitter rather than store this energy for later use.

A plurality of pigment particle circuits, or RF phosphors, can be fabricated by standard semiconductor processing techniques, suspended in a carrier fluid and encapsulated inside a delivery canister such a paint ball. The pigment particles also may be encapsulated in dry (power) form if desired although this is not the conventional form for paint ball projectiles. Methods for forming paint balls are well known in the art. The thickness of the ball may be adjusted to control the splatter size of the deployed fluid. The size of the ball is selected for optimal firing distance using the appropriate paint ball firearm.

Some embodiments of the invention provide numerous technical advantages. According to one embodiment, the RF paint is carried by a micro-air vehicle and dropped onto the radar's antenna in the form of droplets. Alternatively, a high altitude aircraft can deploy a shuttle-cock canister carrying the RF paint and a terminal guiding device so that the paint can be deployed from standoff and drift down onto the radar's active surfaces. In other embodiments, other methods for deployment can be used.

FIG. 3 is a perspective view of an integrated circuit implementation of the pigment particle circuit of FIG. 2 in accordance with one embodiment of the invention. The integrated circuit (IC) 300 includes an antenna layer 302 disposed on top of a gain element layer 304 which is disposed on top of a energy storage element layer 310. In several embodiments, the antenna layer 302 can include any of the antennas described above in the discussion of FIG. 2. In one embodiment, the antenna layer 302 includes a gain element (not shown). In some embodiments, the gain element layer 304 includes any of the gain elements described above in the discussion of FIG. 2. In a number of embodiments, the energy storage layer 310 includes an energy storage device (e.g., capacitor) as described above in the discussion of FIG. 2.

In one embodiment, the integrated circuit 300 is a single sided integrated circuit. In another embodiment, the integrated circuit 300 is a thin film printed circuit board. In other embodiments, the IC 300 can be implemented using other suitable technologies known in the art. In some embodiments, integrated circuit 300 is implemented using CMOS or gallium arsenide (GaAs). In other embodiments, the integrated circuit 300 can be implemented using other suitable materials known in the art. In one embodiment, the surface area of the integrated circuit is approximately 1 millimeter squared. In other embodiments, the integrated circuit implementation can be larger or smaller than 1 millimeter squared. In another embodiment, for example, the surface area of the integrated circuit is approximately 0.2 millimeters squared. In some embodiments, a few cubic centimeters of RF emitting paint can contain thousands of millimeter sized microelectronic particle circuits. In some embodiments, the surface area of the integrated circuit may range from a few micrometers squared to several millimeters squared.

FIG. 4a is a top view of the integrated circuit implementation of FIG. 3. FIG. 4a shows a completed pigment particle 400 including a slot antenna having an upper halve 402a and a lower halve 402b, capacitors (410a, 410b), and a gain element 404. The slot antenna is split so that each halve (upper halve 402, lower halve 404) of the slot antenna is electrically isolated at DC. The capacitors (410a, 410b) are disposed on the left and the right of the pigment particle and can electrically short the two halves of the slot antenna at a particular operating frequency.

The capacitors serve to complete the RF circuit between the two halves of the antenna and also to provide the capacity needed to store electrical energy rectified by the gain element 404. The gain element 404 is disposed at the center of the slot antenna and is connected across the two slot halves (402a, 402b). In some embodiments, a number of electrical vias can be included to interconnect multiple metal layers to form a stacked slot antenna. In the embodiment illustrated in FIG. 4, the pigment particle 400 has a width of 2 millimeters. In other embodiments, the pigment particles can have a width that is larger or smaller than 2 millimeters.

Figure 4B:
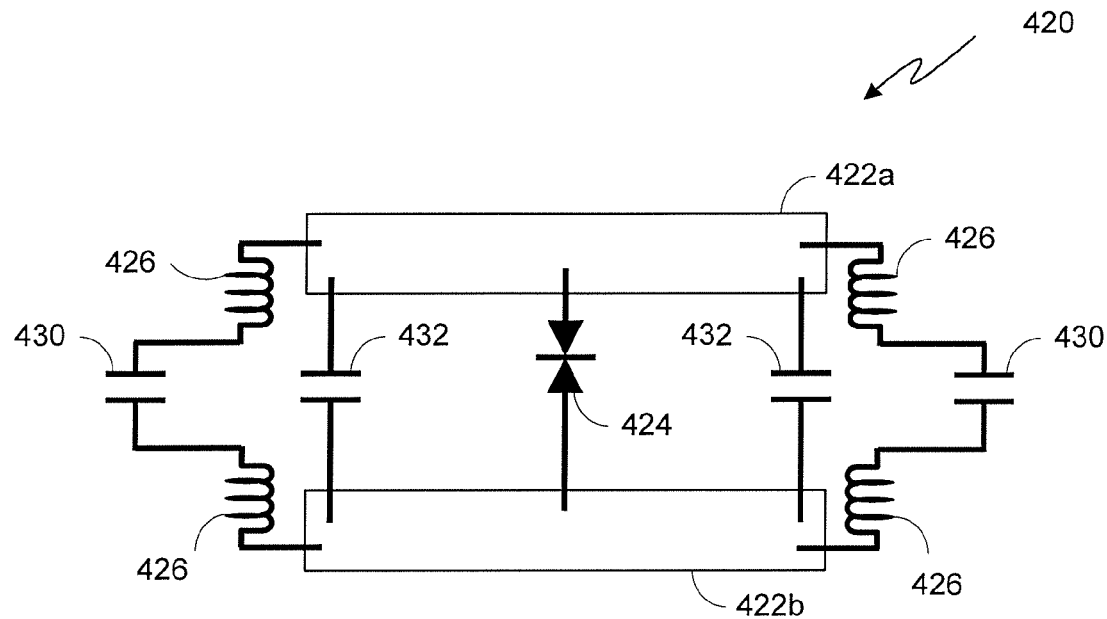
FIG. 4b is a schematic block diagram of a particle circuit in accordance with one embodiment of the invention.

FIG. 4b is a schematic block diagram of a pigment particle circuit 420 in accordance with one embodiment of the invention. The pigment particle circuit 420 includes a slot antenna having an upper halve 422a and a lower halve 422b, a QDot diode 424, blocking filters 426 and capacitors (430, 432). The QDot diode 424 is disposed across the antenna halves (422a, 422b) at a middle portion of the antenna halves. Capacitors 432 are disposed across the antenna halves (422a, 422b) at two end portions of the antenna halves. The blocking filters 426 are coupled to each end portion of the antenna halves and to capacitors 430. The capacitors can be used for both energy storage and for tuning an oscillation circuit that includes the slot antenna. In a number of embodiments, the pigment particle circuit can operate as described above in the discussion of FIG. 2.

Figure 4C:
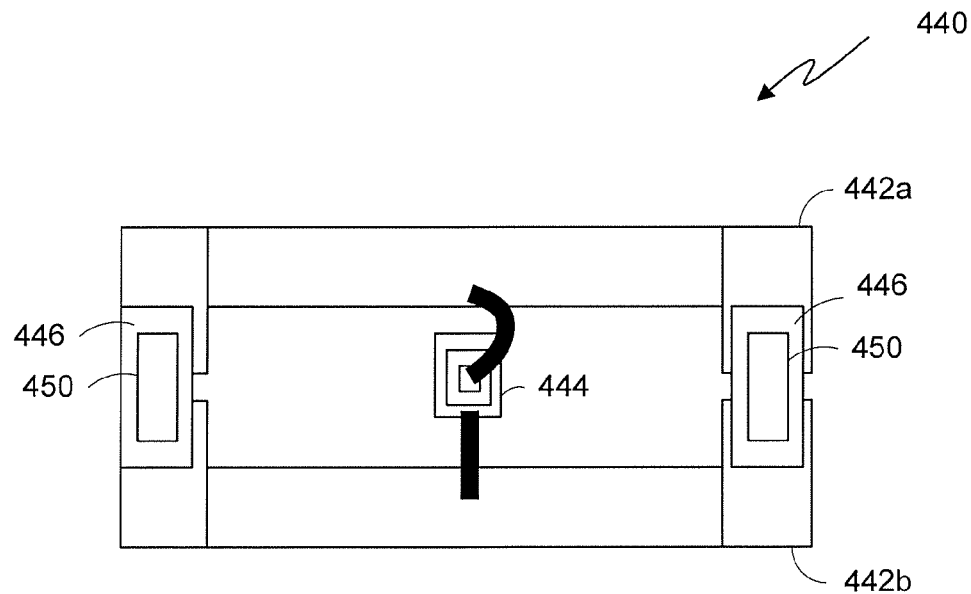
FIG. 4c is a top view of an integrated circuit implementation of the particle circuit of FIG. 4b.

FIG. 4c is a top view of an integrated circuit (IC) implementation 440 of the pigment particle circuit of FIG. 4b. The IC 440 includes a slot antenna having an upper halve 442a and a lower halve 442b, capacitors (formed by top plates 450 and insulators 446), and a QDot 444. The QDot 444 is disposed across the antenna halves (442a, 442b) at a middle portion of the antenna halves. Capacitors 450 are disposed across the antenna halves (442a, 442b) at two end portions of the antenna halves. In many embodiments, the IC 400 can operate as described above in the discussions of FIGS. 4a and 4b.

Figure 5:
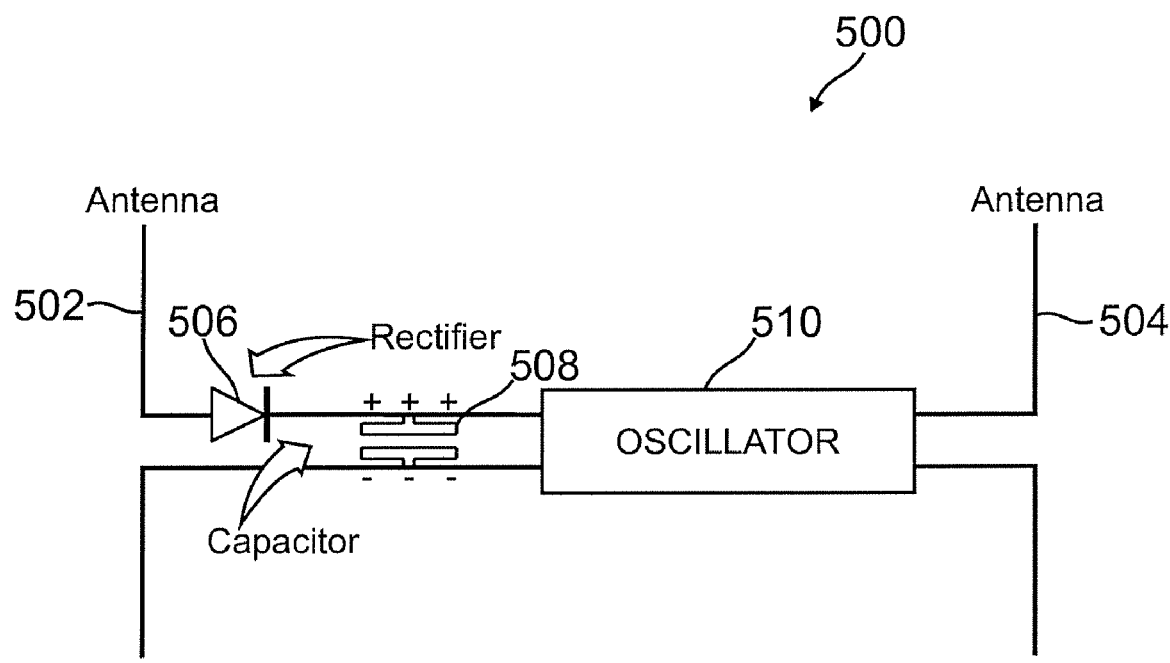
FIG. 5 is a schematic block diagram of a particle circuit having a dipole antenna in accordance with one embodiment of the invention.

FIG. 5 is a schematic block diagram of a particle circuit 500 having a dipole antenna in accordance with one embodiment of the invention. The dipole antenna includes a receiving/capturing antenna 502 and a transmitting antenna 504. The receiving antenna 502 is coupled to a rectifier 506 for converting the received energy to a DC voltage. The rectifier 506 is coupled to a capacitor 508 for storing the DC voltage. The capacitor 508 is coupled to an oscillator 510 for generating energy at a preselected frequency via the transmitting antenna 504 from the voltage stored in the capacitor 508. The embodiment illustrated in FIG. 5 is similar to that of FIG. 2. However, the dipole antenna of FIG. 5 enables the particle circuit to receive energy at one preselected frequency and generate energy at another preselected frequency. In the particle circuit of FIG. 2, the single antenna may limit the receiving frequency and the generating frequency to be roughly equal, in some embodiments. In other aspects, the particle circuit 500 of FIG. 5 can function similar to the particle circuit of FIG. 2.

Figure 6:
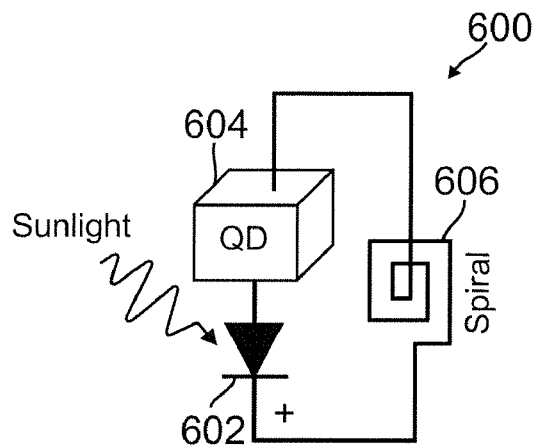
FIG. 6 is a schematic diagram of a particle circuit including a solar cell, a quantum dot gain element (QDot or QD), and a spiral antenna in accordance with one embodiment of the invention.

FIG. 6 is a schematic diagram of a pigment particle circuit 600 including a solar cell 602, a quantum dot gain element (QDot or QD) 604, and a spiral antenna 606 coupled in series in accordance with one embodiment of the invention. The solar cell 602 can generate power after receiving sunlight, other light, or other energy of a suitable frequency range. In one embodiment, the solar cell is formed using materials including N+ InGaAs, N InGaAs, P InGaAs, and P+ InGaAs. In some embodiments, the solar cell 602 also acts as an energy storage device (e.g., a capacitor). In other embodiments, a discrete energy storage device is added to the pigment particle circuit.

The quantum dot gain element 604 can provide a tuning capacitance for an LC circuit consisting of the QDot and the spiral antenna 606 acting as the inductor. In most embodiments, the LC circuit is a resonant circuit with a resonant frequency determined by the capacitance of the QDot 604 and inductance of the spiral antenna 606. In a number of embodiments, the size of the QDot and spiral antenna are set to achieve a preselected resonant frequency. In several embodiments, the preselected resonant frequency is a frequency that interferes with or disrupts operation of a radar system.

In several embodiments, the spiral antenna 606 acts as an oscillator (e.g., in conjunction with the QDot 604). In one embodiment, the spiral antenna 606 is tuned to a narrow frequency range. In other embodiments, the spiral antenna 606 is tuned to a broad frequency range. In some embodiments, other suitable antennas can be used. In a number of embodiments, a plurality of pigment particle circuits are placed in a sticky fluid medium such as paint or another suitable medium.

In one embodiment, the light received by the solar cell can be provided by a man-made device such as a laser. In such case, the pigment particle circuits can be activated by a distance using the laser or a similar suitable device.

Figure 7:
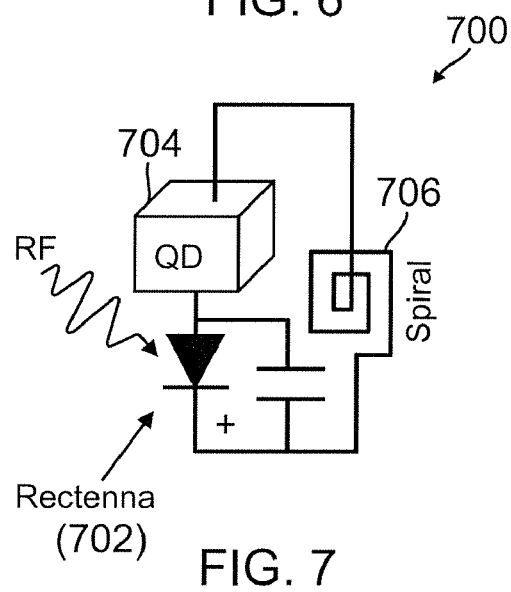
FIG. 7 is a schematic diagram of a particle circuit including a rectifying antenna (rectenna), a QDot, and a spiral antenna in accordance with one embodiment of the invention.

FIG. 7 is a schematic diagram of a pigment particle circuit 700 including a rectifying antenna (rectenna) 702, a QDot 704, and a spiral antenna 706 coupled in series in accordance with one embodiment of the invention. The rectenna 702 can include an antenna (not shown) and a gain element (not shown, e.g., a rectifying diode). In some embodiments, the rectenna 702 can function as described above in the discussion of FIG. 2. In a number of embodiments, the QDot and spiral antenna can function as described above in the discussion of FIG. 7.

In operation, the pigment particle circuit can receive RF signals (e.g., radar signals) and store energy generated therefrom. The QDot and spiral antenna can act as an oscillator to generate signals of a particular frequency range or energy characteristic as to interrupt operation of any radar system operating nearby. In other embodiments, other circuit components and/or additional circuit components can be used. In one embodiment, for example, alternative components as described above in the discussion of FIG. 2 can be used.

Figure 8:
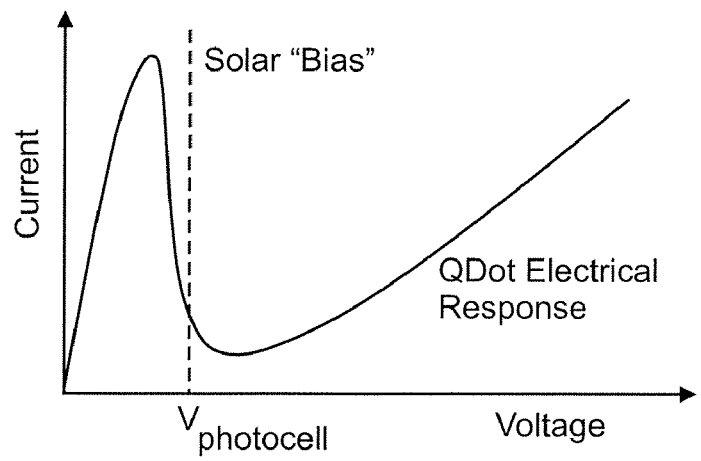
FIG. 8 is a graph of current versus voltage illustrating the electrical response performance characteristics of a QDot in accordance with one embodiment of the invention.

FIG. 8 is a graph of current versus voltage illustrating the electrical response performance characteristics of a quantum dot (QDot) in accordance with one embodiment of the invention. The graph illustrates a condition where the solar cell voltage, V(photocell), biases the QDot in its region of negative differential resistance (NDR). The region of negative differential resistance is defined by a current versus voltage response where the electrical current in the device decreases due to an increase in applied voltage. When plotted graphically, the NDR region is indicated by a negative slope to the current versus voltage response curve of the device. In FIG. 8, this region lies between the initial peak in electrical current and the minimal drop in electrical current just before the trough of the current. This region is also roughly bisected by the Solar Bias voltage, Vphotocell, in FIG. 8. While biased anywhere within this region of NDR, the QDot can supply gain to the surrounding circuitry and may produce spontaneous oscillation if the surrounding circuitry is resonant at a particular frequency. This frequency may be determined by the series inductance and capacitance of the QDot and the inductance of the spiral antenna shown schematically in FIG. 7. The voltage bias provided by the solar cell can be determined by the intensity of ambient solar radiation intercepted by the solar cell.

Figure 9:
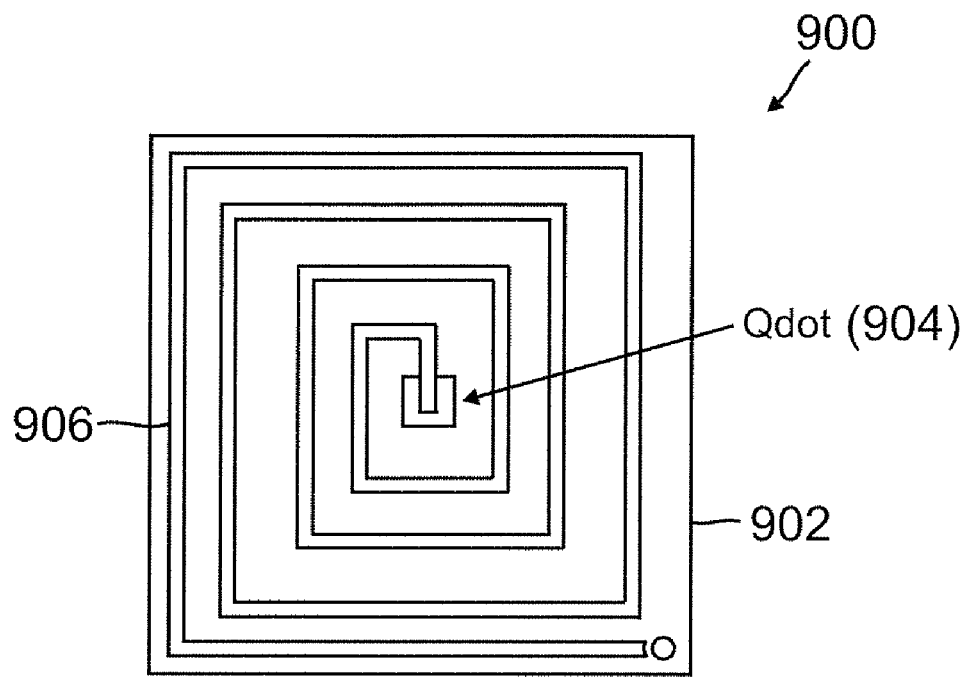
FIG. 9 is a top view of a semiconductor chip implementation of the particle circuits of any of FIG. 2, 5, 6 or 7.

FIG. 9 is a top view of a semiconductor chip implementation 900 of the pigment particle circuits of any of FIG. 2, 6, 7 or 8. The chip 900 includes a solar cell layer 902, a QDot 904 disposed at the center of the chip and on top of the solar cell layer 902, and a spiral antenna 906 also disposed on top of the solar cell layer 902. The pigment particle circuit can operate as described above in the discussions of FIGS. 2, 6, 7 and 8. In some embodiments, the solar cell layer is replaced by a rectanna layer including a second antenna. In one embodiment, another layer providing additional capacitance can be added.

Figure 10:
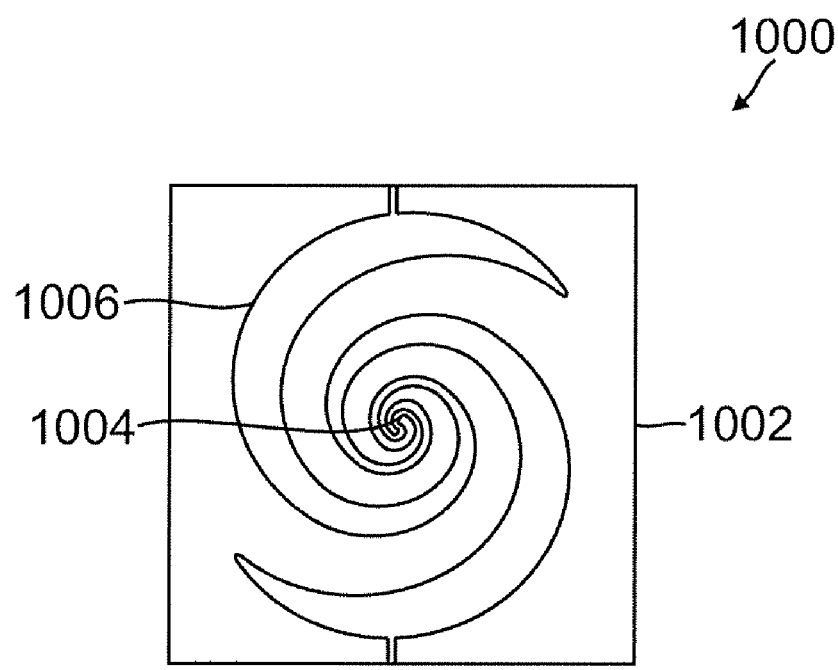
FIG. 10 is a top view of a semiconductor chip implementation of a particle circuit including a broadband spiral antenna in accordance with one embodiment of the invention.

FIG. 10 is a top view of a semiconductor chip implementation 1000 of a pigment particle circuit including a broadband spiral antenna in accordance with one embodiment of the invention. The chip 1000 includes a power source substrate 1002, a QDot 1004 disposed at the center of the chip and on top of the power source substrate, and the broadband spiral antenna 1006 disposed on top of the power source substrate 1002 and coupled to the QDot 1004. The spiral antenna 1006 can be a broadband antenna capable of supporting a wide range of frequencies for both absorption of signals and generation of signals. In some embodiments, the QDot acts as a negative resistance oscillator. In several embodiments, the chip does not store energy and instead dissipates any received or captured energy as disruptive signals without delay.

In one embodiment, the spiral antenna 1006 can be coupled to a solar battery, a solar cell, or the blocking filters of FIG. 2. In some embodiments, the power source substrate 1002 is a solar cell or battery. In another embodiment, the power source substrate 1002 is a rectenna.

Figure 11:
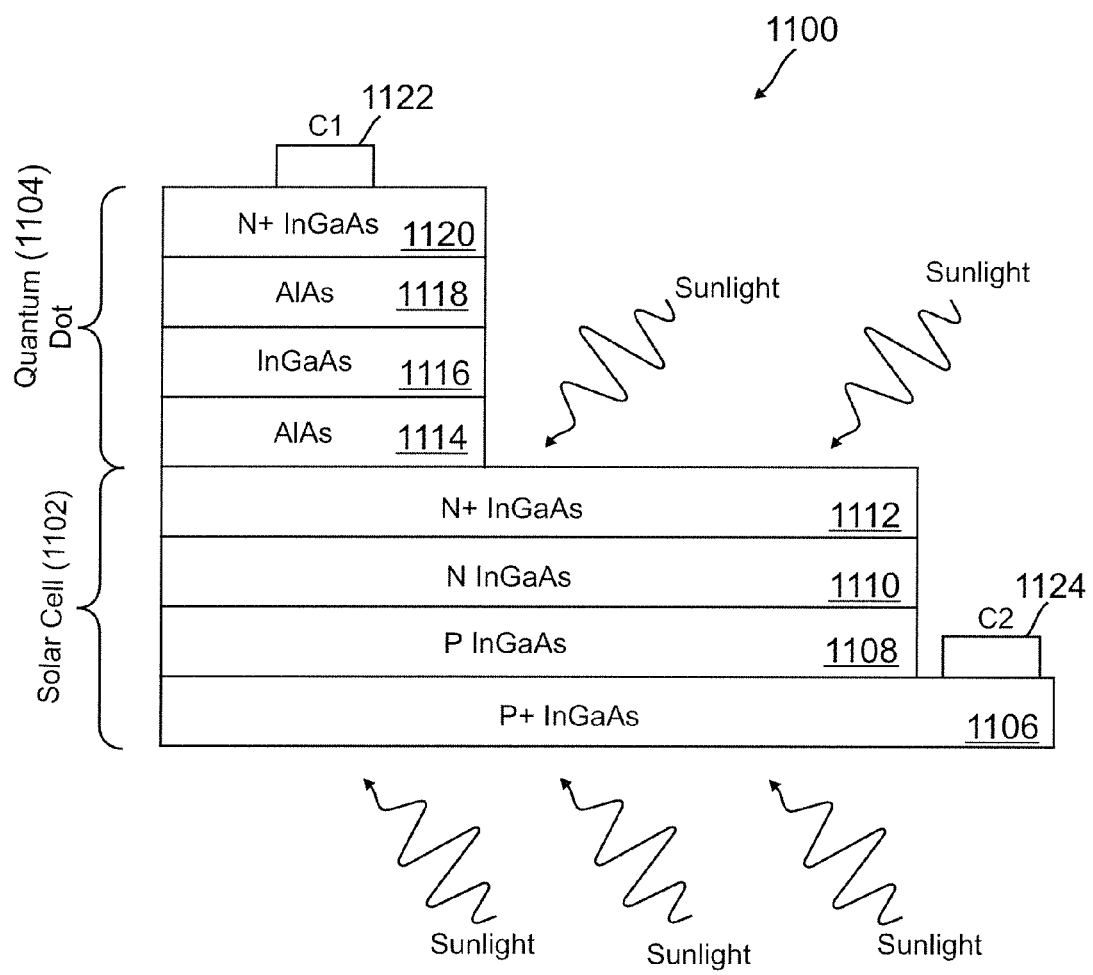
FIG. 11 is a cross sectional view of a semiconductor chip implementation of a particle circuit taken along the width of the chip in accordance with the embodiments of FIG. 9 and FIG. 10.

FIG. 11 is a cross sectional view of a semiconductor chip implementation of a pigment particle circuit taken along the width of the chip in accordance with the embodiments of FIG. 9 and FIG. 10. The chip 1100 includes four bottom substrate layers forming the solar cell 1102 and four top substrate layers forming the QDot 1104. The solar cell 1102 includes, from the bottom, a P+ InGaAs layer 1106, a P InGaAs layer 1108, a N InGaAs layer 1110, and a N+ InGaAs layer 1112. The QDot 1104 includes, beginning on top of the N+ InGaAs layer 1112 of the solar cell 1102, a AlAs layer 1114, a InGaAs layer 1116, a AlAs layer 1118, and a N+ InGaAs layer 1120. A first capacitor layer 1122 is disposed above the N+ InGaAs layer 1120 of the QDot 1104. A second capacitor layer 1124 is disposed above a portion of the P+ InGaAs layer 1106 that extends laterally beyond the rest of the layers of the solar cell 1102. In one embodiment, the QDot 1104 and solar cell 1102 form an epitaxial stack.

In operation, this arrangement of materials allows the QDot and solar cell to function as described above in the discussions of FIGS. 6 through 11. In the embodiment illustrated in FIG. 11, the solar cell is powered by sunlight. In other embodiments, the solar cell can be replaced by a rectenna powered by RF.

QDot devices are well known in the art and can be composed of a number of materials including, for example, GaAs, InGaAs, InGaAlAs, InSb (Indium Antimonide), AlSb (Aluminum Antimonide), and other materials. A QDot can generally be constructed as a three-dimensionally configured heterostructure. In other embodiments, the QDot, or other gain elements described herein, can be replaced with two dimensionally confined resonant tunnel diodes, conventional tunnel diodes, and/or circuit combinations of conventional transistors which are arranged to provide the equivalent current-voltage response of FIG. 8.

Figure 12:
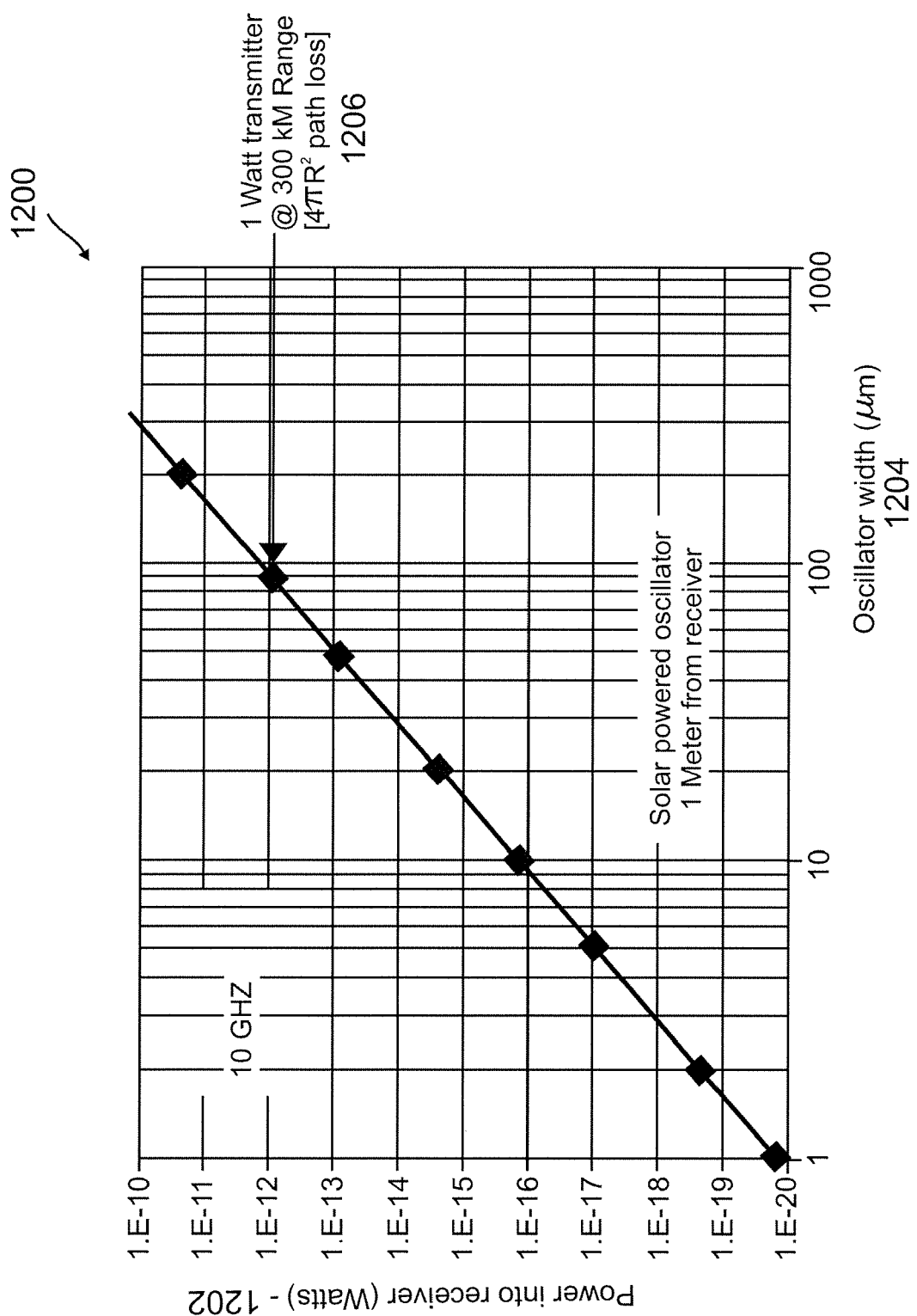
FIG. 12 is a graph of generated power versus oscillator width for a particle circuit including a solar cell disposed approximately one meter from a radar system in accordance with one embodiment of the invention.

FIG. 12 is a graph 1200 of generated power 1202 versus oscillator width 1204 for a pigment particle circuit including a solar cell disposed approximately one meter from a radar system in accordance with one embodiment of the invention. The graph illustrates that, at 10 GHz 1206, a single solar powered dipole oscillator (e.g., 88 um by 88 um) can send the same RF energy into a radar receiver at one meter as a 1 watt transmitter at 300 kilometers from the receiver. In such case, a collection of the solar powered oscillators can provide sufficient RF energy to disrupt operation of a radar system. Available solar power can drop with decreased oscillator area along with antenna efficiency. As such, from a power standpoint, it can be better to deploy a few large oscillators than many smaller ones.

Figure 13:
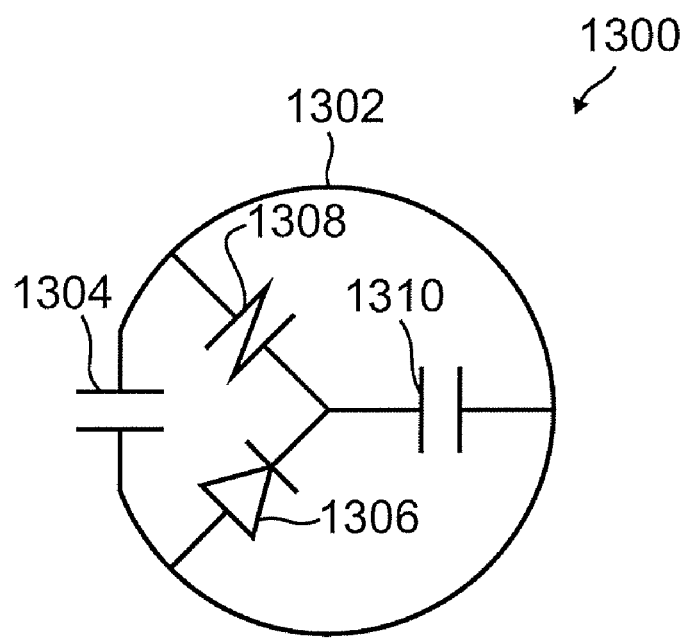
FIG. 13 is a schematic diagram of a particle circuit having a loop antenna in accordance with one embodiment of the invention.

FIG. 13 is a schematic diagram of a particle circuit 130G having a loop antenna 1302 in accordance with one embodiment of the invention. In FIG. 13, the loop antenna 1302 is used to collect energy from an external RF source and to establish the frequency of oscillation for the circuit when stored energy is re-radiated.

The particle circuit 1300 includes the loop antenna 1302 in series with a capacitor 1304. Along loop 1302, one terminal of the capacitor 1304 is coupled to a diode 1306 and another terminal is coupled to a resonant tunnel diode 1308. A second capacitor 1310 is coupled, at one terminal, to a point on the loop antenna 1302 roughly opposite to capacitor 1302, and at a second terminal, to a common node coupling the diode 1306 and resonant tunnel diode 1308. In the embodiment illustrated in FIG. 13, the particle circuit 1300 somewhat resembles a Y-configuration surrounded by a perimeter loop, where the loop antenna 1302 as the perimeter loop.

Capacitor 1304 and loop antenna 1302 form a resonant half wave antenna. Diode 1306 can be a Schottky or other type diode that converts the RF voltage received by the antenna into a DC voltage and stores this electrical energy in capacitor 1310. As the strength of the external RF source increases, the voltage on capacitor 1310 also will increase. When the voltage on capacitor 1310 rises to a value sufficient to bias the resonant tunnel diode 1308 into its negative resistance state, diode 1308 will oscillate at a frequency determined by the parallel combination of capacitor 1304 and loop 1302. Because loop 1302 is a loop antenna this energy of oscillation can be re-radiated by the circuit.

In one embodiment, the reactive impedance of capacitor 1310 may be made very small, such as a few ohms, at the resonant frequency of the antenna. For example, a value of 10 picofarads has a reactive impedance of 1.5 ohms at a frequency 10 GHz. In this embodiment, the capacitor 1310 is effectively an electrical short circuit at both the oscillation frequency of the circuit and at the frequency at which the loop antenna has maximum collection efficiency. Thus, making the value of capacitor 1310 large increases the electrical energy storage capacity of the circuit while not otherwise affecting the RF properties of the circuit. The characteristics of capacitor 1304 and inductive loop 1302 may be varied to change the resonant frequency or to change the electrical impedance that the circuit presents to the tunnel diode 1308 or the rectifying diode 1306.

Figure 14:
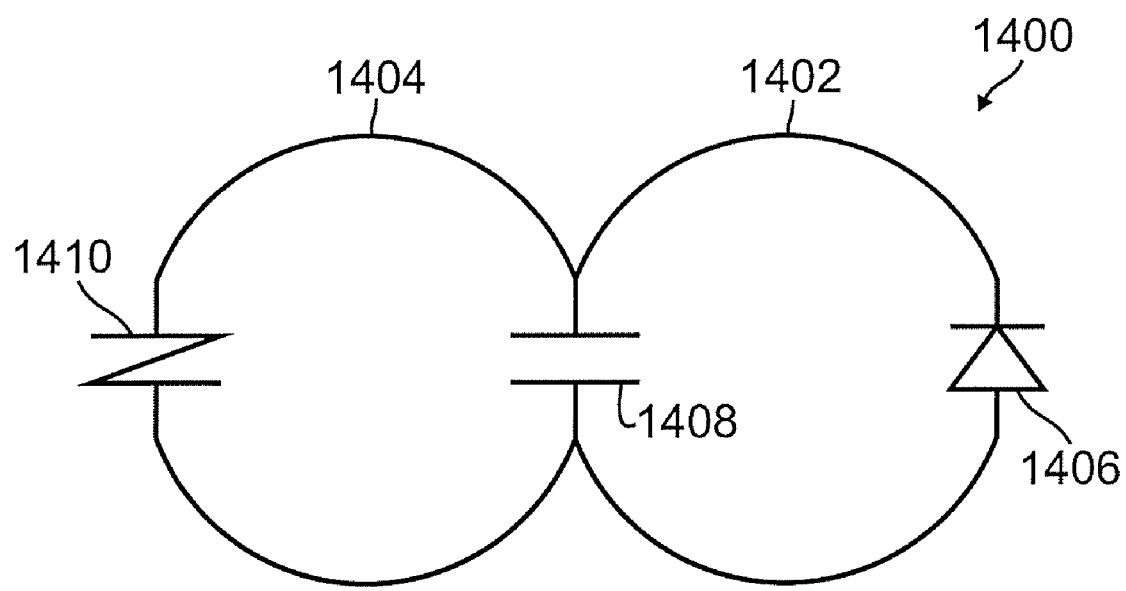
FIG. 14 is a schematic diagram of a particle circuit having two loop antennae in accordance with one embodiment of the invention.

FIG. 14 is a schematic diagram of a particle circuit 1400 having two loop antennae (1402, 1404) in accordance with one embodiment of the invention. The two loop antennae are used separately to collect energy from an external RF source and to establish the frequency of oscillation for the circuit when stored energy is re-radiated.

The particle circuit 1400 includes the first loop antenna 1402 (receiving or Rx antenna) having a diode 1406 coupled in series at a first point along the loop 1402 and a capacitor 1408 coupled in series at a second point opposite to the first point. Capacitor 1408 is also coupled in series to the second loop antenna 1404 (transmitting or Tx antenna). A resonant tunnel diode 1410 is coupled in series along the second loop antenna 1404 at a point opposite of the capacitor 1408.

The first resonant loop antenna 1402 effectively includes diode 1406 and capacitor 1408. Capacitor 1408 is generally made large enough in value to provide an electrical short at the operating frequency. RF energy received by the Rx loop antenna 1402 is rectified by diode 1406 and stored in capacitor 1408. Tunnel diode 1410, Tx loop antenna 1404, and capacitor 1408 form an oscillator. As the strength of the external RF source increases, the voltage on capacitor 1408 also will increase. When the voltage on capacitor 1408 rises to a value sufficient to bias the resonant tunnel diode 1410 into its negative resistance state, tunnel diode 1410 will oscillate at a frequency determined by the parallel combination of tunnel diode 1410 and the inductance of the Tx loop antenna 1404. Because antenna 1404 is a loop antenna this energy of oscillation will be re-radiated by the circuit. The characteristics of the Rx loop and Tx loop may be independently varied to change the optimum collection frequency and optimum re-radiation frequency of the circuit. The two loop antennas therefore provide for independent selection of the collection frequency and the radiation frequency.

Figure 15:
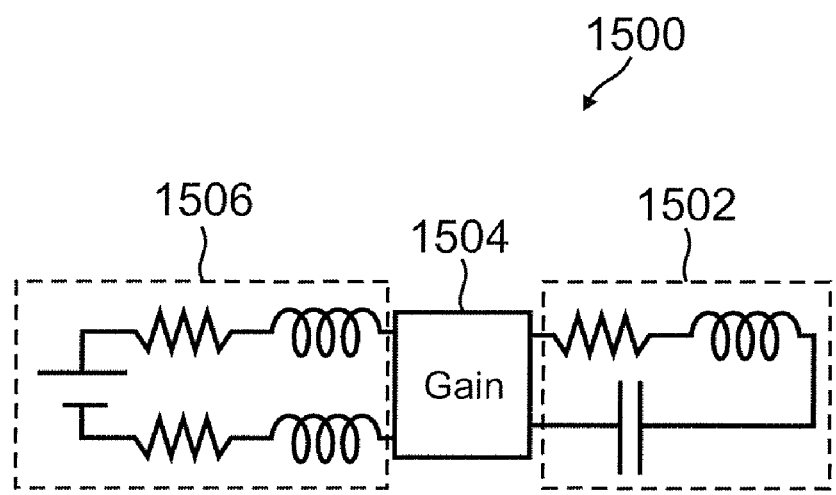
FIG. 15 is a schematic block diagram of a particle circuit having a ring resonator in accordance with one embodiment of the invention.

FIG. 15 is a schematic block diagram of a particle circuit 1500 having a ring resonator 1502 in accordance with one embodiment of the invention. The ring resonator 1502 is coupled to a gain element 1504 such as a resonant tunnel diode. The gain element is coupled to a DC power supply 1506 such as any of the rectannas or solar power sources described herein. The ring resonator can be used to determine the oscillation frequency, or resonant frequency, of the radiation section of the particle circuit. In conjunction with the ring resonator, the transmitting/radiating antenna(s) can also be tuned to the resonant frequency. In operation, the particle circuit can otherwise function as described previously for any of the various embodiments of particle circuits.

The circuit of FIG. 15 has the advantage that the resonant frequency of the oscillator may be determined by a circuit element, in this case a ring resonator, which may be less susceptible to ambient objects such as metals or dielectrics. In some of the embodiments, the resonant frequency of the oscillating circuit is set by the resonant frequency of the antenna radiator. Since an antenna necessarily attempts to couple RF energy into the environment it may be the case that the resonant frequency of an antenna may be shifted due to electromagnetic coupling with metals or dielectrics which are proximal to the antenna. Circuit elements such as ring resonators are relatively less susceptible to parasitic effects such as adjacent materials because the electromagnetic fields and currents are confined within the resonator by design. Therefore, embodiments that use a non-radiating resonator to establish the frequency of oscillation of the circuit may be less affected by ambient materials.

Figure 16:
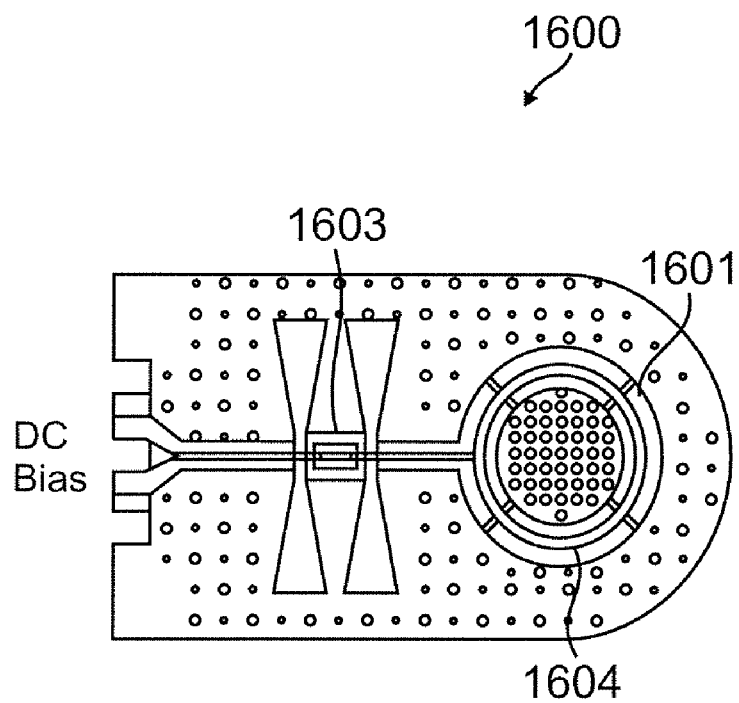
FIG. 16 is a top view of a semiconductor chip implementation of the particle circuit of FIG. 15 in accordance with one embodiment of the invention.

FIG. 16 is a top view of a semiconductor chip implementation 1600 of the particle circuit 1500 of FIG. 15 in accordance with one embodiment of the invention. The chip implementation 1600 includes a ring resonator 1601 coupled to a resonant tunnel diode 1604 in the energy radiation portion 1502 of the particle circuit 1500. The implementation 1600 also includes a slot antenna radiator 1603 in the energy capture (power supply) portion 1506 of the particle circuit 1500. The resonant tunnel diode 1604 bridges the electrical gap between the resonator ring 1601 and the surrounding ground plane. The slot antenna 1603 is fowled in the ground plane metal and is coupled to the oscillator circuit via the transmission line that connects the power supply (DC bias) to the ring resonator 1601 and resonant tunnel diode 1604. The section of transmission line that lies between the point of attachment of the power supply and the antenna 1603 serves as an RF blocking filter (or choke) that isolates the power supply circuit from the RF circuitry at the frequency of oscillation. The power supply (DC bias) is attached between the ground plane metal and the center of the transmission line.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

For example, while the invention has been described as relating to a radar system, the performance of virtually any radio frequency receiver or transceiver can be degraded when coated with paint that is phosphorescent, or another material providing disruptive RF signals, within the receiver tuning range. Further, in some embodiments, the pigment particles can be used for tagging or position marking. In some cases, the pigment particle materials can be coated onto a variety of objects and then powered by ambient RF or optical (light) energy, which could be solar or man-made.

In another embodiment, the pigment particle circuits may include a battery that is pre-charged before deployment onto the radar system so that the particles may radiate an interfering signal without the need to be powered by the radar transmitter.

In several embodiments, the particle circuits include a single gain element that incorporates both rectification (e.g., using a rectenna) and oscillation (e.g., gain) properties within the same two terminal device.

In some embodiments, the particle circuits can be used for tagging applications. In such case, for example, a special operations team could apply an innocuous looking paint containing the particle circuits onto a vehicle or building which would absorb ambient solar or RF energy and then re-remit a delayed homing signal to an intelligence operations center. In one embodiment, a plume of this paint could be dispersed in front of an enemy's electronic intelligence satellite or another target. In such case, the RF or solar energy of the satellite can be converted into broadband RF noise at the satellite platform's collection antenna.

In some embodiments, the pigment particles are suspended within a dielectric binder material such as acrylic, polyurethane, epoxy resin, or other suitable material. In some embodiments, the pigment particles can operate over a variety of frequencies spanning strong sources such as radar systems and weak sources such as urban communication nodes. In some embodiments, the pigment particles receive RF energy from a radar system. In other embodiments, the pigment particles receive RF energy from a more generic radio communication transmitter. In such case, RF paint containing the pigment particles can be applied to a number of military related devices and communication systems in accordance with preselected objectives.

In some embodiments, the pigment particles include a diode rectifier implemented with a Schottky diode, a p-i-n diode, the base-emitter junction of a bipolar transistor, or the junction diode of a field effect transistor. In some embodiments, the pigment particle circuits are designed to operate in the cell phone band (e.g., 2.45 GHz). In one embodiment, for example, the pigment particle circuits are designed to operate in range extending from 1 to 100 GHz. In some embodiments, the pigment particles can perform both narrow and broadband emission for jamming of radars, satellite communications, tagging, tracking and locating.

What is claimed is:

1. A composite for generating radio frequency (RF) signals, the composite comprising:
 a medium configured to adhere to a device for emanating communication signals; and
 at least one particle circuitry within the medium;
 wherein the at least one particle circuitry is configured to radiate radio frequency signals for disrupting the communication signals of the device.

2. The composite of claim 1, wherein the medium is a fluid medium.

3. The composite of claim 2, wherein the fluid medium is paint.

4. The composite of claim 1, wherein the medium is contained within a vessel.

5. The composite of claim 1, wherein the at least one particle is further configured to:
   receive radio frequency energy from the device; and
   generate the radio frequency signals using, at least in part, the received energy.

6. The composite of claim 5, wherein the at least one particle is further configured to store the received energy.

7. The composite of claim 1, wherein the device is a radar antenna.

8. The composite of claim 7, wherein the radar antenna comprises a dipole antenna.

9. The composite of claim 1, wherein the device is a radio communication transmitter.

10. The composite of claim 1, wherein the at least one particle is further configured to:
    receive energy from a source of light energy; and
    generate the radio frequency signals using, at least in part, the received energy.

11. The composite of claim 10, wherein the source of light energy is the sun.

12. The composite of claim 10, wherein the source of light energy is a laser.

13. The composite of claim 1:
    wherein the at least one particle is further configured to:
      receive radio frequency energy at a first frequency from the device; and
      generate the radio frequency signals at a second frequency using, at least in part, the received energy; and
    wherein the first frequency and the second frequency are approximately equal.

14. The composite of claim 1:
    wherein the at least one particle is further configured to:
      receive radio frequency energy at a first frequency from the device; and
      generate the radio frequency signals at a second frequency using, at least in part, the received energy; and
    wherein the first frequency and the second frequency are not equal.

15. The composite of claim 1, wherein the at least one particle includes a tunnel diode for generating the radio frequency signals for disrupting the communication signals of the device.

16. A composite for generating radio frequency (RF) signals, the composite comprising:
    a medium configured to adhere to a device for emanating communication signals; and
    at least one particle circuitry within the medium;
    wherein the at least one particle circuitry is configured to radiate signals for marking a position of the device.

17. The composite of claim 16, wherein the medium is a fluid medium.

18. The composite of claim 17, wherein the fluid medium is paint.

19. The composite of claim 16, wherein the medium is contained within a vessel.

20. The composite of claim 16, wherein the at least one particle is further configured to:
    receive radio frequency energy from the device; and
    generate radio frequency signals using, at least in part, the received energy.

21. The composite of claim 20, wherein the at least one particle is further configured to store the received energy.

22. The composite of claim 16, wherein the device is a radar antenna.

23. The composite of claim 16, wherein the device is a radar antenna, and wherein the radar antenna comprises a dipole antenna.

24. The composite of claim 16, wherein the device is a radio communication transmitter.

25. The composite of claim 16, wherein the at least one particle is further configured to:
    receive energy from a source of light energy; and
    generate radio frequency signals using, at least in part, the received energy.

26. The composite of claim 25, wherein the source of light energy is the sun.

27. The composite of claim 25, wherein the source of light energy is a laser.

28. A composite for disrupting signals associated with a source of ambient radio frequency (RF) energy, the composite comprising:
    a medium configured to adhere to a device for emanating communication signals; and
    a particle circuitry within the medium and configured to:
      receive energy from the source of ambient RF energy; and
      generate radio frequency signals, using the received energy, for disrupting signals emanating from the source of ambient RF energy.

29. A composite for disrupting signals associated with a source of ambient radio frequency (RF) energy, the composite comprising:
    a medium containing at least one particle comprising an antenna and a gain element;
    the gain element configured to:
      rectify radio frequency energy received by the antenna; and
      oscillate using the received energy.

30. The composite of claim 29, wherein the gain element is a two-terminal negative resistance device.

31. The composite of claim 29, wherein the gain element is a tunnel diode.

32. The composite of claim 29, wherein the antenna comprises a dipole antenna.

* * * * *